United States Patent [19]

Davy et al.

[11] Patent Number: 5,040,233

[45] Date of Patent: Aug. 13, 1991

[54] DATA COMPRESSION BY DISCARDING PORTIONS OF DATA

[75] Inventors: Rex W. Davy; David J. Harris, both of Gloucester, England

[73] Assignee: Crosfield Electronics Ltd., England

[21] Appl. No.: 462,206

[22] Filed: Jan. 9, 1990

[30] Foreign Application Priority Data

Jan. 9, 1989 [GB] United Kingdom ............... 8900368

[51] Int. Cl.⁵ .............................................. G06K 9/36
[52] U.S. Cl. ...................................... 382/56; 358/433; 358/261.1
[58] Field of Search .................. 382/56; 358/426, 433, 358/261.1

[56] References Cited

U.S. PATENT DOCUMENTS 4,291,339 9/1981 Ogawa et al. ........................ 358/260

FOREIGN PATENT DOCUMENTS 0089797 9/1983 European Pat. Off. .
0218448 4/1987 European Pat. Off. .
0261561 3/1988 European Pat. Off. .
0286286 10/1988 European Pat. Off. .

OTHER PUBLICATIONS

Xerox Disclosure Journal, vol. 8, No. 3, May/Jun. 1983, pp. 275–277.

Primary Examiner—Leo H. Boudreau
Assistant Examiner—David Fox
Attorney, Agent, or Firm—Sughrue, Mion, Zinn, Macpeak & Seas

[57] ABSTRACT

A method of modifying a digital representation of an image in which digital data defines the content of pixels of the image. The method comprises a) determining whether a predetermined degree of compression can be achieved if data defining a block of pixels is compressed by applying a predetermined compression algorithm; and, if not, b) discarding a portion of the data in the block, and repeating steps a and b on the most recently modified block until the predetermined degree of compression is achieved, and generating a compressed version of the image.

14 Claims, 3 Drawing Sheets

DATA COMPRESSION BY DISCARDING PORTIONS OF DATA

FIELD OF THE INVENTION

The invention relates to methods and apparatus for modifying a digital representation of an image in which the digital data defines the content of pixels of the image.

DESCRIPTION OF THE PRIOR ART

In conventional typesetting applications, an output device such as a laser printer is controlled from an output store in which the image to be printed is defined by a bit map containing binary data for each pixel on a one to one ratio with the output pixels. Conventionally, the output store is formed by a magnetic disc. The high resolutions which are now being used to define an image lead to two problems. The volume of data requires large storage while the requirement to image a page quickly, due to the fast output rates of modern output devices, means that high access rates to the data are required. Conventional discs are unable to permit data to be read sufficiently fast for the output device continuously to operate.

An example of the volume of data which is typically processed can be seen by considering a broad-sheet page of 18" (45.7 cm) by 24" (61 cm), or 432 square inches (2787 cm$^2$). A resolution of 2540 dots per linear inch gives a data requirement of 6,451,600 pixels per square inch. Thus a broad-sheet page at this resolution occupies 2,787,091,200 pixels. This is equivalent to about 332 megabytes. Typically, typesetters are aiming at setting a page in a minute thus requiring a data rate of 5.5 megabytes per second.

For most types of image on a page, such as text, an improvement has been achieved by compressing the data using a conventional compression technique such as run length encoding so that the amount of data that has to be stored in the output store is much less than the original raw data. Typically, in the case of text or open line drawings, there is redundancy in the raw bit map data of up to 90%. Even in the case of a screened image, the redundancy may be 50%. However, a typesetting system must be able to cope with types of image which cannot be significantly compressed. These images would normally have been produced synthetically and include pseudo-random arrangements of data. At present, there is no image modification system which can cope efficiently with such incompressible images.

SUMMARY OF THE INVENTION

In accordance with one aspect of the present invention, a method of modifying a digital representation of an image in which digital data defines the content of pixels of the image comprises:
a) determining whether a predetermined degree of compression can be achieved if data defining a block of pixels is compressed by applying a predetermined compression algorithm; and, if not,
b) discarding a portion of the data in the block, and repeating steps a and b on the most recently modified block until the predetermined degree of compression is achieved, and generating a compressed version of the image.

In accordance with a second aspect of the present invention, apparatus for modifying a digital representation of an image in which digital data defines the content of pixels of the image comprises processing means for carrying out the steps of:
a) determining whether a predetermined degree of compression can be achieved if data defining a block of pixels is compressed by applying a predetermined compression algorithm; and, if not,
b) discarding a portion of the data in the block, and repeating steps a and b on the most recently modified block until the predetermined degree of compression is achieved, and generating a compressed version of the image.

We have recognised that in the small proportion of cases where significant compression cannot be achieved and particularly at the high resolutions at which the volume of data causes problems, there is no significant loss in detail by discarding a portion of the data completely. This can lead to a significant increase in compression ratio being achieved When the compressed version of the image is subsequently used to control an output device, the output device can reconstitute the discarded data in a number of ways. For example, immediately adjacent data can simply be repeated or additional data can be interpolated from the adjacent data. In either event, this reconstitution can be achieved without limiting the speed of the output device.

In the preferred arrangement, each block of pixels comprises an integral number of lines of pixels defining the output image. This is particularly advantageous since in most cases the output image will have a raster form and each block can comprise a number of lines of the raster. However, in certain applications it will be possible for a block to comprise an array of pixels which does not have a dimension corresponding to an outer dimension of the output image.

Step (a) can be performed by applying the predetermined algorithm to the digital data (and it will be assumed that this is the case in the remainder of this specification). However, other methods which do not involve compressing the data could be used to determine the compressibility.

There are various ways in which the invention can be implemented. For example, step a can comprise compressing data defining pairs of lines of pixels and comparing the resulting compressed data with the data needed to define a single line, step b being carried out if the compressed data has a greater volume than that needed to define a single line and in which step b comprises discarding one of the lines of data.

In a modification of this method, groups of more than two lines could be considered with the intention that each block should be compressed to define data no greater than that required to define a single line.

In an alternative application, step a comprises compressing all the data in a block; and comparing the volume of the compressed data with that which it is required should be finally generated, step b comprising discarding a portion of the block of data if the volume of the compressed data is greater than that which is required.

This alternative method differs from the first method described since the location of the data to be discarded can be from anywhere within the block. Normally, where each block comprises a number of lines of data, the data which is discarded will constitute one or more complete lines chosen from within the block.

In a third alternative, step a may comprise determining whether a memory into which the compressed data is to be stored has been filled before all the original digital data corresponding to the block has been compressed.

In this third alternative, the compressed data will be written directly into an output memory, such as a RAM, which can be rewritten as required. In the other methods, an intermediate memory, such as a RAM, is required to allow the data to be processed, the finally generated, compressed data then being written to a further memory, such as a disc store.

The compression techniques applied in step a may comprise any conventional technique such as one dimensional run length encoding, which is particularly suitable where lines of pixels are involved, or a two dimensional technique.

Typically, header information will be generated for each compressed block defining the form of the data in the compressed block (compressed or raw) and defining those parts of the uncompressed data which need to be reconstituted.

The processing means may comprise a suitably programmed microcomputer; a hardware arrangement; or a combination of the two.

BRIEF DESCRIPTION OF THE DRAWINGS

Some examples of methods and apparatus in accordance with the present invention will now be described with reference to the accompanying drawings, in which.

DETAILED DESCRIPTION OF THE EMBODIMENTS

Figure 1:
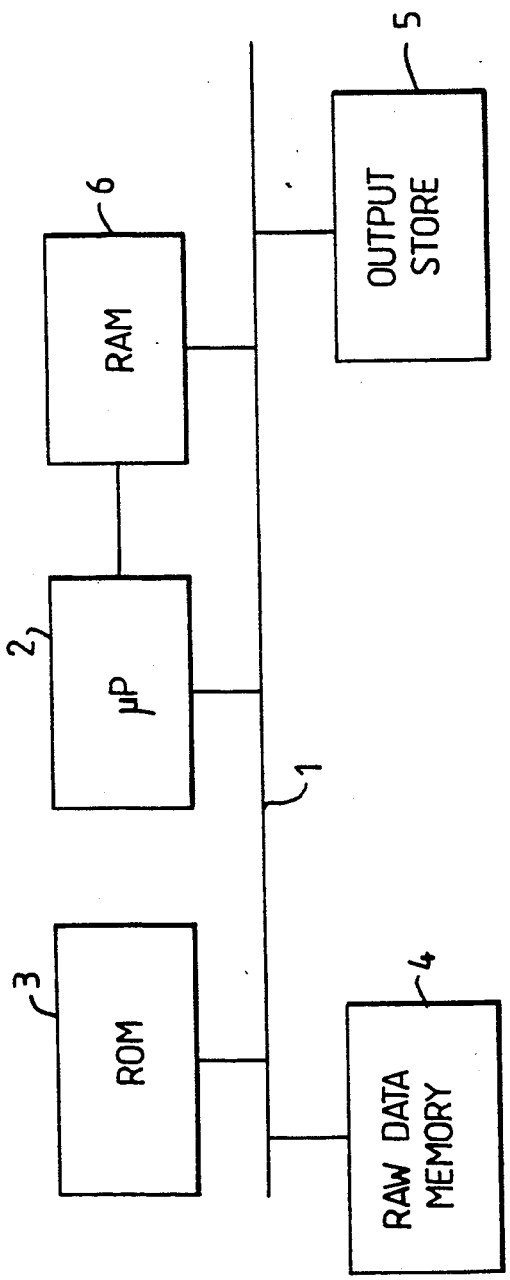
FIG. 1 is a block diagram of the apparatus.

The apparatus shown in FIG. 1 comprises a data bus 1 to which is connected a microprocessor 2 controlled by a program stored in a ROM 3. Raw data in binary form defining an image to be output is stored in a memory 4. Typically, the data in the memory 4 will not be stored in the form of a composite page but as individual subsidiary images which the operator wishes to combine in some particular manner. The finished form of the image which is to be output is stored in an output store 5, in binary form and compressed in the manner to be described below. A random access memory (RAM) 6 is provided for use during the compression process.

Figure 2:
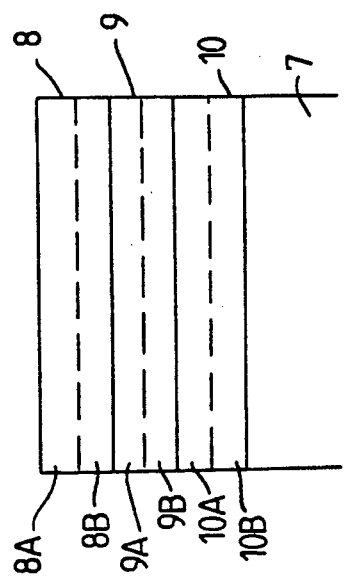
FIG. 2 illustrates schematically one method of dividing an image of a page into blocks for processing.

In operation, the user defines the location and orientation of images such as text which he wishes to include in a final output page in a conventional manner. The microprocessor 2 has been programmed to extract the relevant subsidiary images and to create in the output store 5 a representation of the output page. In one method, the microprocessor scans the data in the memory 4 in blocks of two horizontal scan lines of output image. FIG. 2 illustrates part of an output page 7 with the first three blocks of output pixel lines 8-10 being illustrated. Each of the blocks 8-10 comprises a pair of horizontal lines of pixels 8A, 8B; 9A, 9B; and 10A, 10B.

Figure 3:
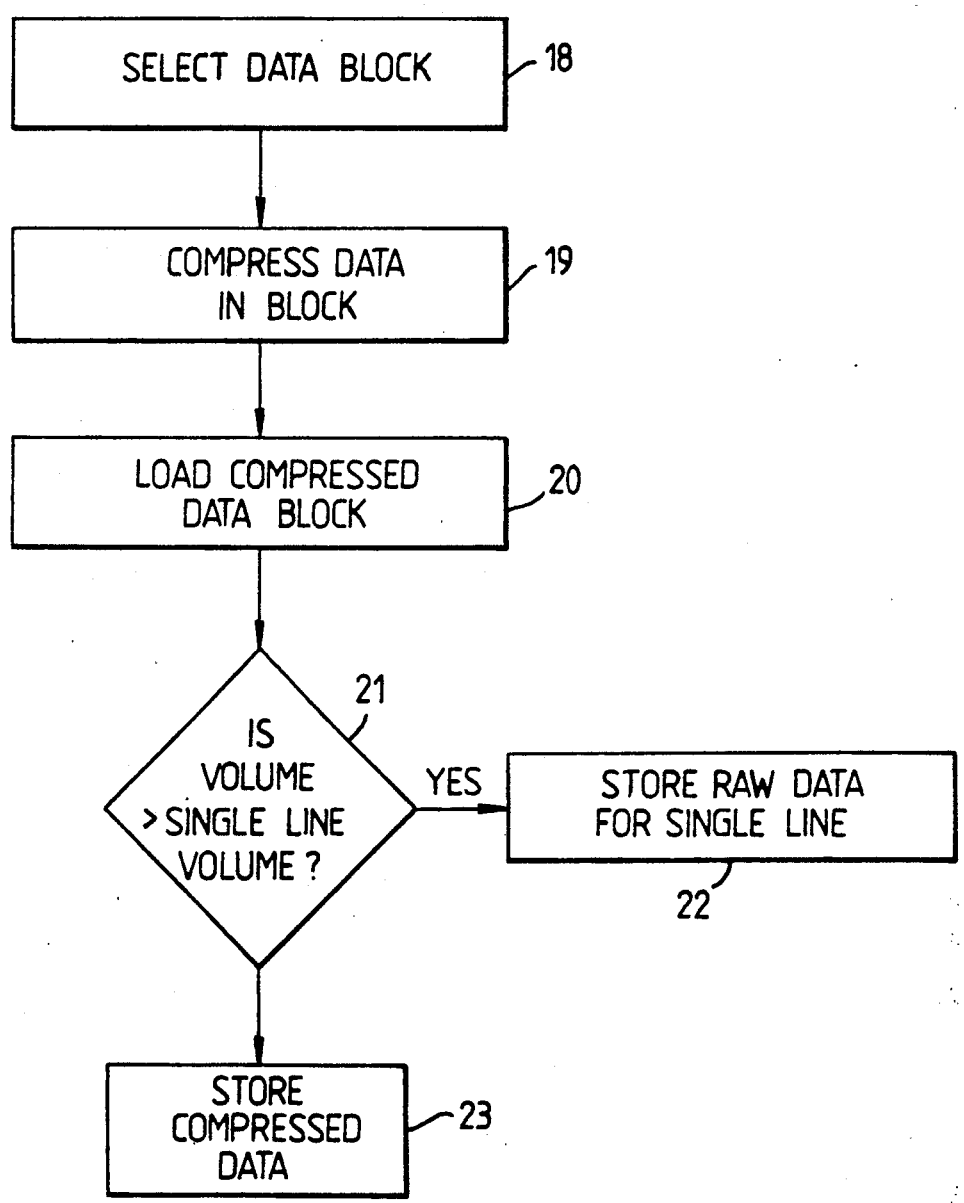
FIG. 3 is a flow diagram illustrating operation of the microprocessor.

The microprocessor selects a two line data block (step 18, FIG. 3) and loads (step 20) each pair of scan lines defining a block into the RAM 6 after performing (step 19) a compression algorithm on the data (FIG. 3). For example, this may be a one dimensional run length encoding algorithm. The microprocessor 2 then determines the volume of data which has been stored in the RAM 6 and compares (step 21) this with the volume of data which is needed to define a single scan line in its raw form. If the volume of data in the RAM 6 is greater than that needed for a single line then the microprocessor selects one of the two lines, for example line 8A or 8B, to be discarded and causes the remaining line to be stored in its raw form in the output store 5, such as a disc store (step 22). Otherwise the compressed data is stored in the store 5 (step 23).

This process is repeated for each block of scan lines 9, 10 etc. until a full image has been stored in the output store 5. It will be appreciated that this process will result in a compression ratio of at least 2:1.

The output store 5 is then connected with an output device, such as a laser printer, which outputs the image onto paper or the like and can operate at its normal, high speed since a relatively low number of disc accesses is required. It will be appreciated that a decompression circuit (not shown) is provided between the output store 5 and the printer to enable the data to be decompressed.

In order that the decompression circuit can determine how to respond to the data in the output store, which can be compressed, raw (i.e. resulting from the discarding of an adjacent line), or require the repetition of a previous line, each line of data in the store 5 is preceded by a header. This header includes a start of header marker followed by control bits which indicate the form of the data i.e. compressed or raw, and whether or not that data is to be repeated for the next line.

In one modification of this method each block of pixels may comprise more than two lines with the microprocessor 2 attempting to compress the volume of data to that needed for a single line.

It will be appreciated that the RAM 6 can be small and correspond at the minimum to two lines of raw pixel data.

Figure 4:
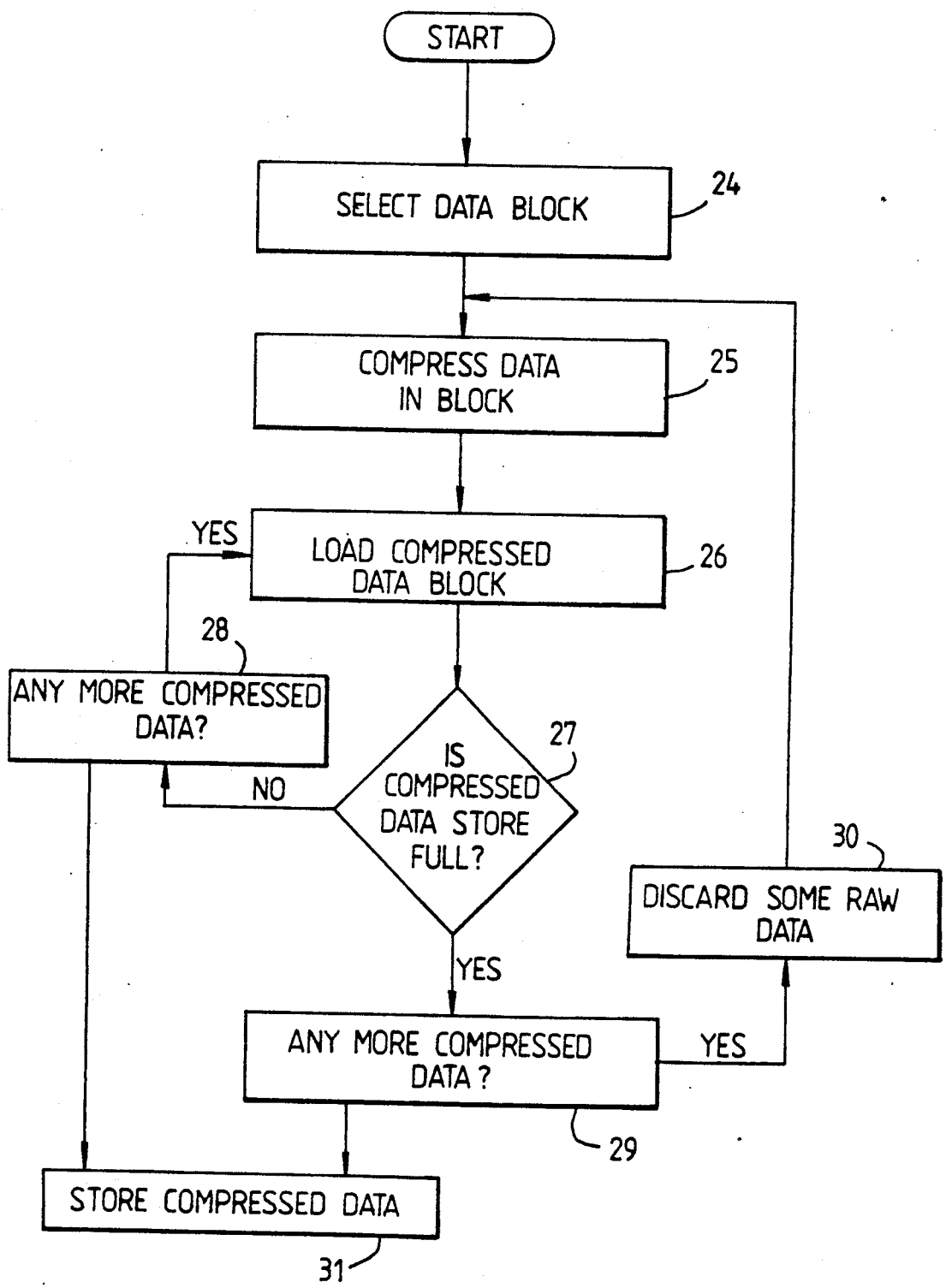
FIG. 4 is a flow diagram illustrating another method of operation of the microprocessor.

In an alternative method (FIG. 4), the RAM 6 is able to store more than two lines of data, for example, ten lines, and the microprocessor 2 will operate on the data in a different manner. In this case, a required compression ratio is set by the microprocessor 2 (for example 2:1), the microprocessor 2 accesses (step 24) a certain number of lines of data from the memory 4 (for example 10 lines) constituting a block and performs (step 25) a compression on those lines in an attempt to reduce them to the required number of lines. To achieve this, the data is read out from the memory 4, compressed and then stored (step 26) in the RAM 6 in sequence. The microprocessor 2 checks (step 27) regularly whether the maximum desired number of lines in the RAM 6 have been filled and, if not, determines whether there is further data to compress (step 28). If the RAM 6 is full and not all data has been compressed (step 29) the microprocessor 2 repeats the process after having discarded (step 30) one or more of the lines of raw data from the block. These lines can be chosen from anywhere within the block of data. The finally compressed version of the data in the RAM 6 is then loaded (step 31) into the output store 5, as before.

In a further alternative (not shown), the intermediate store formed by the RAM 6 can be omitted. In this case, data is compressed and stored directly in the output store 5 which typically will not be in the form of a disc store but in the form of a relatively large RAM. In this case, the raw data from the memory 4 is accessed in blocks by the microprocessor 2 and compressed, the compressed data being stored in the store 5. The compression technique adopted can be any of the methods described above. For example, the raw data from the memory 4 may be accessed in pairs of lines with one line of raw data being discarded if sufficient compression cannot be achieved and the other line of raw data being stored as raw data in the output store 5. Alternatively, the data resulting from the application of the compression algorithm can be stored initially in the store 5 and if it is found that the compressed data corresponding to a block of raw data will exceed the allotted space within the memory 5, then the microprocessor will reaccess the original raw data defining the block, discard one or more lines of that data and then recompress it until it does fit within the allotted space.

We claim:

1. A machine implemented method of modifying a digital representation of an image in which digital data defines the content of pixels of the image, the method comprising
  a) determining whether a predetermined degree of compression can be achieved if data defining a block of pixels is compressed by applying a predetermined compression algorithm; and, if not,
  b) discarding a portion of the data in said block, and always repeating said step a on the most recently modified block and repeating said step b, if necessary, until the predetermined degree of compression is achieved, and generating a compressed version of said image.

2. A method according to claim 1, wherein each said block of pixels comprises an integral number of lines of pixels defining said image.

3. A method according to claim 1, wherein step a) is performed by applying said predetermined algorithm to said digital data.

4. A method according to claim 1, wherein step a) comprises compressing data defining pairs of lines of pixels and comparing the resulting compressed data with the data needed to define a single line, step b being carried out if said compressed data has a greater volume than that needed to define a single line and in which step b comprises discarding one of said lines of data.

5. A method according to claim 1, wherein step a comprises compressing all said data in a block; and comparing the volume of the compressed data with that which it is required should be finally generated, step b comprising discarding a portion of said block of data if said volume of said compressed data is greater than that which is required.

6. A method according to claim 1, wherein step a) comprises determining whether a memory into which said compressed data is to be stored has been filled before all the original digital data corresponding to said block corresponding to the block has been compressed.

7. A method according to claim 1, wherein header information is generated for each compressed block defining the form of said data in said compressed block and defining those parts of the uncompressed data which need to be reconstituted.

8. A method according to any of the preceding claims, wherein said compression algorithm applied in step a) is one dimensional runlength encoding.

9. Apparatus for modifying a digital representation of an image in which digital data defines the content of pixels of the image, the apparatus comprising processing means for carrying out the steps of
  a) determining whether a predetermined degree of compression can be achieved if data defining a block of pixels is compressed by applying a predetermined compression algorithm; and, if not, b) discarding a portion of the data in the block, and always repeating said step a on the most recently modified block and repeating said step b, if necessary, until the predetermined degree of compression is achieved, and generating a compressed version of the image.

10. Apparatus according to claim 9, further comprising a RAM into which said compressed data is loaded by said processing means.

11. Apparatus according to claim 10, wherein said RAM is capable of storing only two lines of said compressed data.

12. Apparatus according to claim 9, wherein said processing means comprises a suitably programmed microcomputer.

13. Method according to claim 1, wherein said digital data defines the content of the image pixels in bit map form.

14. Apparatus according to claim 9, wherein said digital data defines the content of the image pixels in bit map form.

* * * * *